US008441673B2

(12) United States Patent
Tomoda

(10) Patent No.: US 8,441,673 B2
(45) Date of Patent: *May 14, 2013

(54) IMAGE FORMING APPARATUS WITH REDUCED START-UP TIME

(75) Inventor: Hiroaki Tomoda, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/553,841

(22) Filed: Jul. 20, 2012

(65) Prior Publication Data

US 2012/0327468 A1 Dec. 27, 2012

Related U.S. Application Data

(63) Continuation of application No. 12/041,272, filed on Mar. 3, 2008, now Pat. No. 8,253,959.

(30) Foreign Application Priority Data

Mar. 6, 2007 (JP) ................................ 2007-055646

(51) Int. Cl.
*G06F 3/12* (2006.01)
*G06K 15/00* (2006.01)

(52) U.S. Cl.
USPC ........................................ 358/1.15; 358/1.14

(58) Field of Classification Search .................. 358/1.1, 358/1.8, 1.14, 1.15, 1.13, 400, 448
See application file for complete search history.

(56) References Cited

U.S. PATENT DOCUMENTS

| | | | |
|---|---|---|---|
| 7,050,197 | B1 | 5/2006 | Szumla et al. |
| 2001/0040704 | A1 | 11/2001 | Kanno |
| 2007/0104007 | A1 | 5/2007 | Mizuno |

FOREIGN PATENT DOCUMENTS

| | | |
|---|---|---|
| JP | 2004-265650 | 9/2004 |
| JP | 2005-297264 | 10/2005 |

*Primary Examiner* — Gabriel Garcia
(74) *Attorney, Agent, or Firm* — Dickstein Shapiro LLP

(57) ABSTRACT

A disclosed image forming apparatus forming a visible image on a recording medium includes: a functional element required for an image forming operation; a first control unit controlling the functional element; an input unit inputting an external instruction; and a second control unit communicating with the first control unit about information on the image, performing a process in accordance with the instruction input via the input unit, and outputting a return signal for starting the functional element required for performing the process in accordance with the instruction.

5 Claims, 10 Drawing Sheets

IMAGE FORMING APPARATUS WITH REDUCED START-UP TIME

CROSS-REFERENCE TO RELATED APPLICATIONS

The present application is a continuation of application Ser. No. 12/041,272 filed on Mar. 3, 2008, now U.S. Pat. No. 8,253,959, the entire disclosure of which is incorporated herein by reference.

BACKGROUND OF THE INVENTION

1. Field of the Invention

The present invention relates to an image forming apparatus capable of starting a function required by a user in response to an instruction from the user.

2. Description of the Related Art

In recent years, with the increasing concern about the global environmental issues, reduction of power consumption in image forming apparatuses such as copying machines have attracted a lot of attention. In view of this, many image forming apparatuses shift to a power-saving mode on condition that a print request is not received for a certain period of time, for example. Then, power supply used for a heater is stopped or power supply to a CPU for control and a memory used for the CPU is stopped, for example, so as to reduce power consumption. On the other hand, a time for returning from such a power-saving mode is naturally desired to be shorter in terms of convenience.

Conventionally, the returning time from the power-saving mode has been most dependent on a warm-up time for a fuser when the fuser reaches a temperature enabling image formation. However, with the advancement of techniques for warming up the fuser in a short period of time, the warming-up of the fuser is completed in a short period of time. Nowadays, time required for a warm-up operation such as a preliminary operation and the like in units other than the fuser poses a new problem. In other words, the warm-up operation limits reduction of a start-up time for an entire image forming apparatus. Specifically, unless the preliminary operation of other units such as a communication initialization operation in a control unit, for example, is completed, it is impossible to start the warm-up operation of the fuser.

Patent Documents 1 and 2 disclose inventions as techniques for resolving such a problem, for example. An invention disclosed in Patent Document 1 includes a heater, a first switching element turning on and off electricity from a power supply for heating the heater, a first hardware control circuit switching on and off the switching element by hardware control, a computer operating based on a predetermined program, and a control unit switching on and off the switching element by software control in accordance with a process performed by the computer instead of the hardware control after the computer is initialized. The electric supply to the heater is started without waiting for the computer performing the software control to be initialized, so that it is possible to quickly heat the heater.

An invention disclosed in Patent Document 2 relates to an image forming device for forming an image in which an electrostatic latent image formed on an electrostatic latent image carrier is developed and visualized using a developer layer carried on a developer carrier, a visualized image is transferred to a recording medium, and a toner image transferred on the recording medium is fixed by a fuser unit. The image forming apparatus includes at least two of a copying machine function, printer function, and facsimile machine function. The image forming apparatus includes a warm-up control unit performing a warm-up operation only on a structure relating to a function selected by a user or a function for which a job is input upon powering on or returning from a long period of non-performing status through a user operation input or a job input. In accordance with this, it is possible to reduce time to wait for an image of the selected job to be output and to reduce quantity of electricity and conserve energy in an entire apparatus.

Patent Document 1: Japanese Laid-Open Patent Application No. 2004-265650

Patent Document 2: Japanese Laid-Open Patent Application No. 2005-297264

In the invention disclosed in Patent Document 1, the electric supply to the heater is started without waiting for the computer performing the software control to be initialized, so that it is possible to quickly heat the heater. However, in this case, only the initialization of the computer is handled, so that when an element other than the computer, namely, a communication function unit as hardware is not started, for example, the heater is not heated and it is impossible to reduce the start-up time.

Further, in the invention disclosed in Patent Document 2, when only the function selected by the user is used, the start-up time is reduced. However, when plural instructions are input at one time or when a main power supply of the image forming apparatus is switched on, namely, when starting the entire image forming apparatus, it is impossible to reduce the start-up time. In other words, the method disclosed in Patent Document 2 only starts the function selected by the user, so that the start-up time is reduced in comparison with a time to start all the functions of the image forming specification. However, the start-up time is not reduced when all the functions are started at one time. Further, in the invention disclosed in Patent Document 2, a time of operation required to start a function to be used is not changed. For example, a time of an initialization operation (software process and the like) upon establishing communication between a control unit and a relevant function unit of the image forming apparatus is not changed. Accordingly, a start-up time for each function block per se is not reduced.

SUMMARY OF THE INVENTION

It is a general object of the present invention to provide an improved and useful image forming apparatus in which the above-mentioned problems are eliminated.

A more specific object of the present invention is to provide an image forming apparatus that can reduce a start-up time even when starting all the functions of the image forming apparatus.

According to one aspect of the present invention, there is provided an image forming apparatus forming a visible image on a recording medium, comprising: a functional element required for an image forming operation; a first control unit controlling the functional element; an input unit inputting an external instruction; and a second control unit communicating with the first control unit about information on the image, performing a process in accordance with the instruction input via the input unit, and outputting a return signal for starting the functional element required for performing the process in accordance with the instruction.

The image forming apparatus according to the above-mentioned invention may include: a selection unit selecting the functional element desired by a user upon powering on or returning from a long period of non-performing status, wherein the second control unit may output a return signal for the functional element selected by the selection unit and the selected functional element may be started in accordance with the return signal.

In the image forming apparatus according to the above-mentioned invention, before an initialization operation for establishing communication between the first control unit and the second control unit is completed upon powering on or returning from a long period of non-performing status, a start-up operation of the functional element may be performed in accordance with the instruction along with the initialization operation.

In the image forming apparatus according to the above-mentioned invention, the functional element may receive the return signal and start the functional element per se, the first control unit and the second control unit may perform an initialization operation for establishing communication between the first control unit and the second control unit, and the started functional element may perform an operation thereof.

In the image forming apparatus according to the above-mentioned invention, the functional element may include a reading unit optically reading a document, and the reading unit may transmit image data read from the document to the second control unit via the first control unit.

In the image forming apparatus according to the above-mentioned invention, the second control unit may transmit received image data to a personal computer functioning as the input unit.

In the image forming apparatus according to the above-mentioned invention, the functional element may include a reading unit optically reading a document and a facsimile unit, the reading unit may transmit image data read from the document to the second control unit via the first control unit, and the second control unit may transmit received image data to an external device.

In the image forming apparatus according to the above-mentioned invention, the functional element may include a fuser device, and when starting and warming up of the fuser device is completed, an image may be formed on the recording medium and output.

In an embodiment described later, the functional element corresponds to a fuser unit 5 or a scanner unit 6, the first control unit corresponds to a control unit 7, the input unit corresponds to an operation unit 8 or a personal computer 9, the second control unit corresponds to a controller unit 2, the selection unit corresponds to the controller unit 2, the return signal corresponds to a return signal B, the reading unit corresponds to a scanner unit 6, and the fuser device corresponds to the fuser unit 5, respectively.

The present invention provides the first control unit controlling the functional element required for an image forming operation and the second control unit communicating with the first control unit about information on the image and outputting a return signal for starting the functional element required for performing the process in accordance with the instruction. Thus, it is possible to reduce the start-up time even when all the functions of the image forming apparatus are started.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
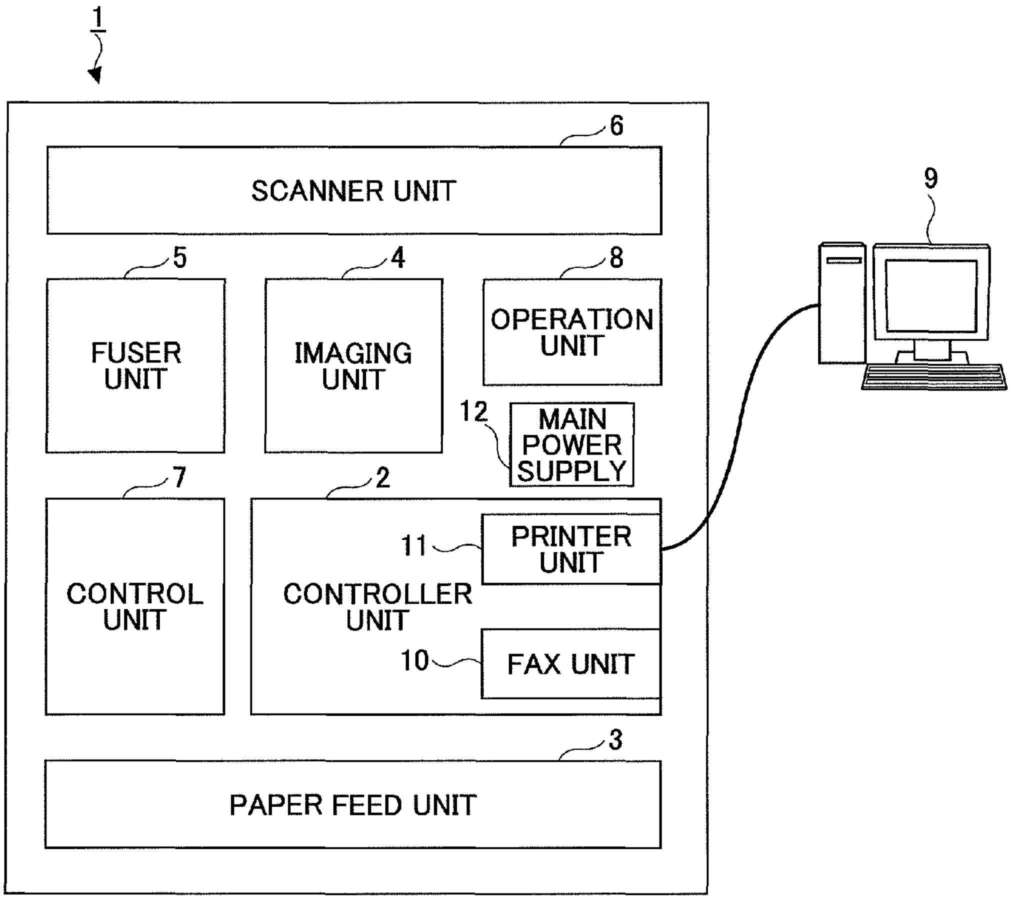
FIG. 1 is a functional block diagram schematically showing a structure of an image forming apparatus according to a first example of an embodiment of the present invention.

FIG. 1 is a functional block diagram schematically showing a structure of an image forming apparatus according to an example of an embodiment of the present invention. In FIG. 1, an image forming apparatus 1 includes a controller unit 2, paper feed unit 3, imaging unit 4, fuser unit 5, scanner unit 6, control unit 7, operation unit 8, and main power supply 12. The image forming apparatus 1 is connected to a personal computer 9 such that various types of information is transmitted and received from each other.

The controller unit 2 includes a FAX unit 10 and a printer unit 11 and is capable of communication with a user (personal computer 9 in this case). The controller unit 2 receives and processes instructions from the user (personal computer 9) and outputs a return instruction to each function block. The paper feed unit 3 feeds recording paper to the imaging unit 4. The imaging unit 4 forms a visible image on the recording paper. The fuser unit 5 fixes toner on the recording paper after the image is formed. The scanner unit 6 scans a document and optically reads an image on the document. The control unit 7 controls various types of operations necessary for an image formation process. The user is allowed to directly operate the image forming apparatus 1 via the operation unit 8 or the personal computer 9. The image forming apparatus 1 is capable of operating supply/non-supply of commercial power supply to the image forming apparatus 1 by switching on/off the main power supply 12. In the present embodiment, the FAX unit 10 and the printer unit 11 are disposed inside the controller unit 2. However, the FAX unit 10 and the printer unit 11 may be disposed as a unit separate from the controller unit 2.

Figure 2:
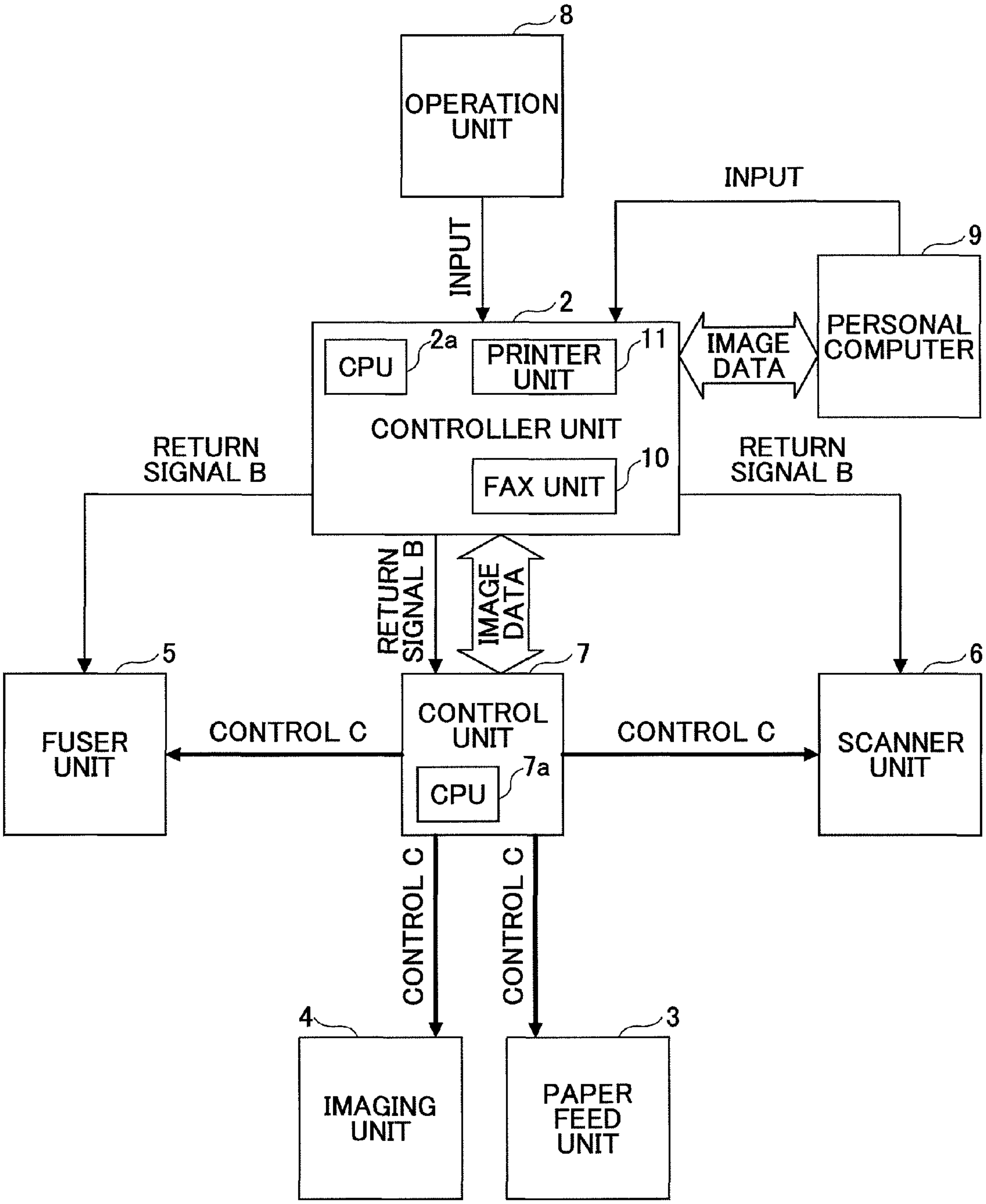
FIG. 2 is a block diagram showing a connection relationship among a controller unit, each function block, and user operation block in FIG. 1.

FIG. 2 is a block diagram showing a connection relationship among the controller unit 2, each function block, and user operation blocks 3 to 11. All return signals B for starting each function block are output through the controller unit 2. The controller unit 2 receives output instructions and image output data to the image forming apparatus 1 from the user and transmits and receives image data with the control unit 7, the image data being transmitted from the image forming apparatus 1 to the user. Operations of the paper feed unit 3, imaging unit 4, fuser unit 5, and scanner unit 6 used as the function blocks necessary for an image forming operation (such as a copy operation) are controlled using control signals C from the control unit 7.

The operation unit 8 or the personal computer 9 is connected to the controller unit 2. When an instruction is sent to the image forming apparatus 1 from the user by operating the operation unit 8 or the personal computer 9, the instruction is processed in the controller unit 2. Further, CPUs (2*a* and 7*a*) are mounted on both controller unit 2 and control unit 7. Image data is transmitted and received between the controller unit 2 and the control unit 7 after the initialization operation (software process and the like) upon establishing communication between the controller unit 2 and the control unit 7 is performed. When the printer function is used, image data input from the personal computer 9 is sent from the controller unit 2 to the control unit 7 and imaging is started. Although the CPUs 2*a* and 7*a* are mounted on the controller unit 2 and the control unit 7 in the present embodiment, this is an example and a number of CPUs are not limited in particular.

FIRST EXAMPLE

Figure 3:
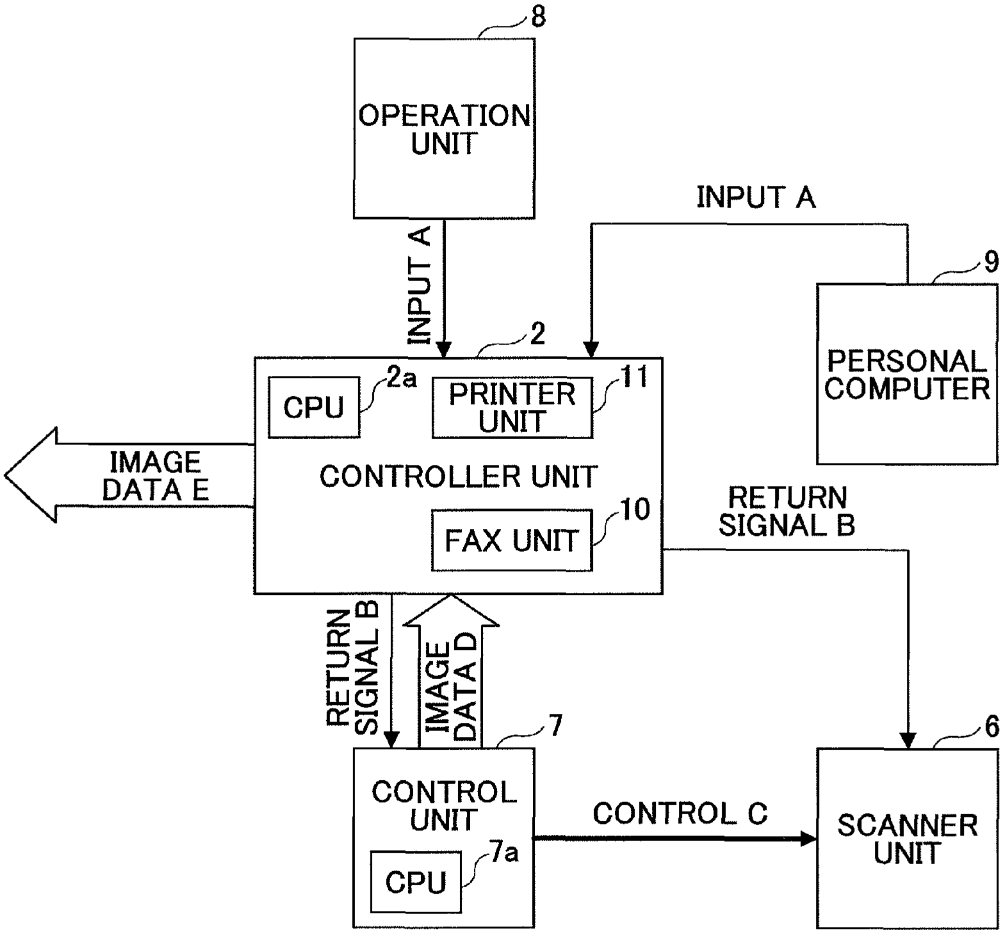
FIG. 3 is a block diagram illustrating an operation of a first example.
Figure 4:
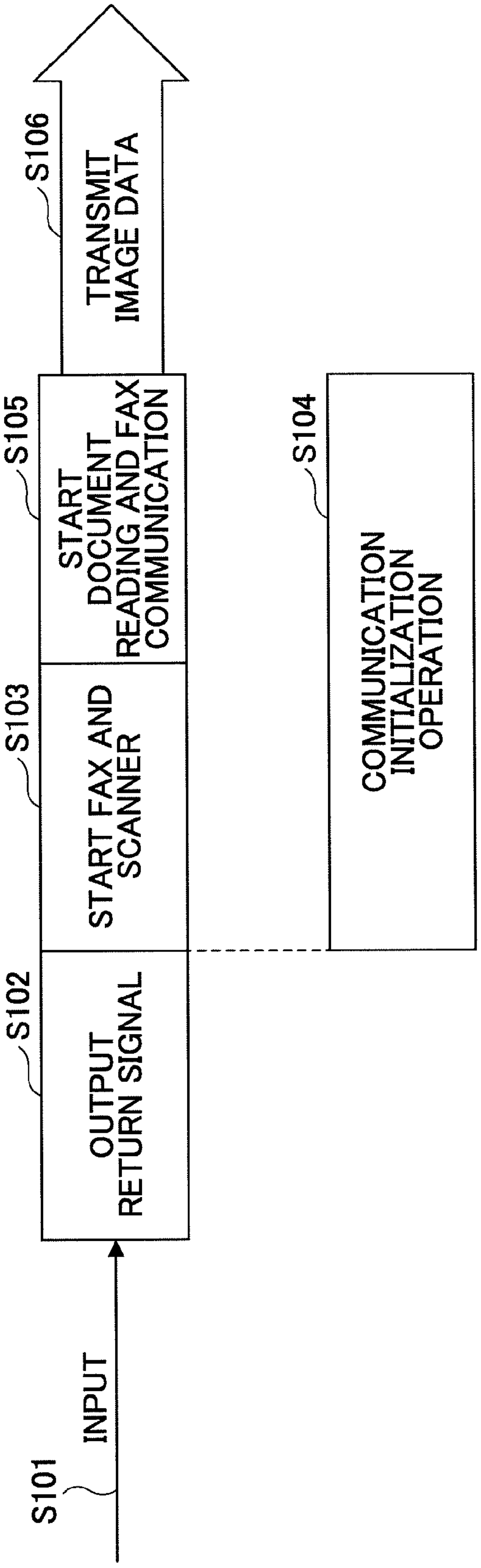
FIG. 4 is a sequence diagram illustrating an operation of a first example.

FIGS. 3 and 4 are a block diagram and a sequence diagram illustrating an operation according to a first example of the embodiment of the present invention. The first example shown in FIGS. 3 and 4 illustrates partial functions of an entire structure shown in FIGS. 1 and 2. In FIGS. 3 and 4, when a FAX transmission function is used in the power-saving mode, first, a FAX function is selected (S101: input A) from the operation unit 8 or the personal computer 9. Then, the return signal B is sent from the controller unit 2 to the scanner unit 6 and the control unit 7 (S102) in accordance with the instruction. The scanner unit 6 becomes capable of reading and the FAX function enters a stand-by state (S103), and the initialization operation for establishing communication between the controller unit 2 and the control unit 7 is started (S104). During the initialization operation of the controller unit 2 and the control unit 7, it is possible to perform a reading operation of the scanner, so that the scanner unit 6 reads an image and a destination number is input from the operation unit 8. Then, the FAX unit 10 starts a communication operation with a destination (S105). During this process, the initialization operation for establishing communication between the controller unit 2 and the control unit 7 is completed. When the FAX unit 10 becomes capable of communication with the destination, image data D is sent from the scanner unit 6 to the controller unit 2 via the control unit 7 and image data E is transmitted to the destination from the controller unit 2 (S106). In addition, reference C designates a control signal output from the control unit 7 to an object of control.

In this manner, according to the present example, when the FAX transmission function is used in the image forming apparatus in the power-saving mode, the return signal B is output using the controller unit 2 so as to immediately start and enable the FAX unit 10 communicating with the destination and the scanner unit 6 reading the document. In accordance with this, while the document is read and communication with the destination is confirmed, image communication is enabled between the controller unit 2 and the control unit 7. Thus, it is possible to reduce a waiting time for the user (start-up time) upon using the FAX transmission function. In this case, only those portions necessary for the FAX function are started, so that it is possible to reduce power consumption.

SECOND EXAMPLE

Figure 5:
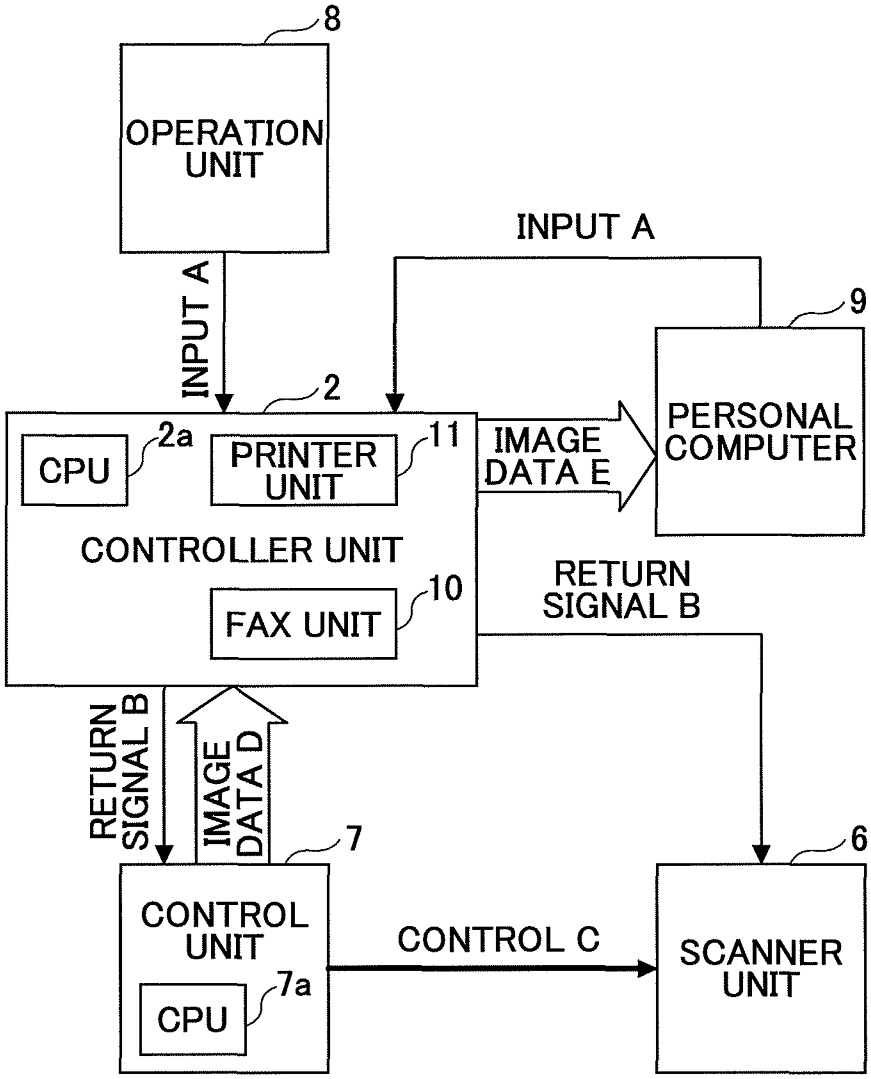
FIG. 5 is a block diagram illustrating an operation of a second example.
Figure 6:
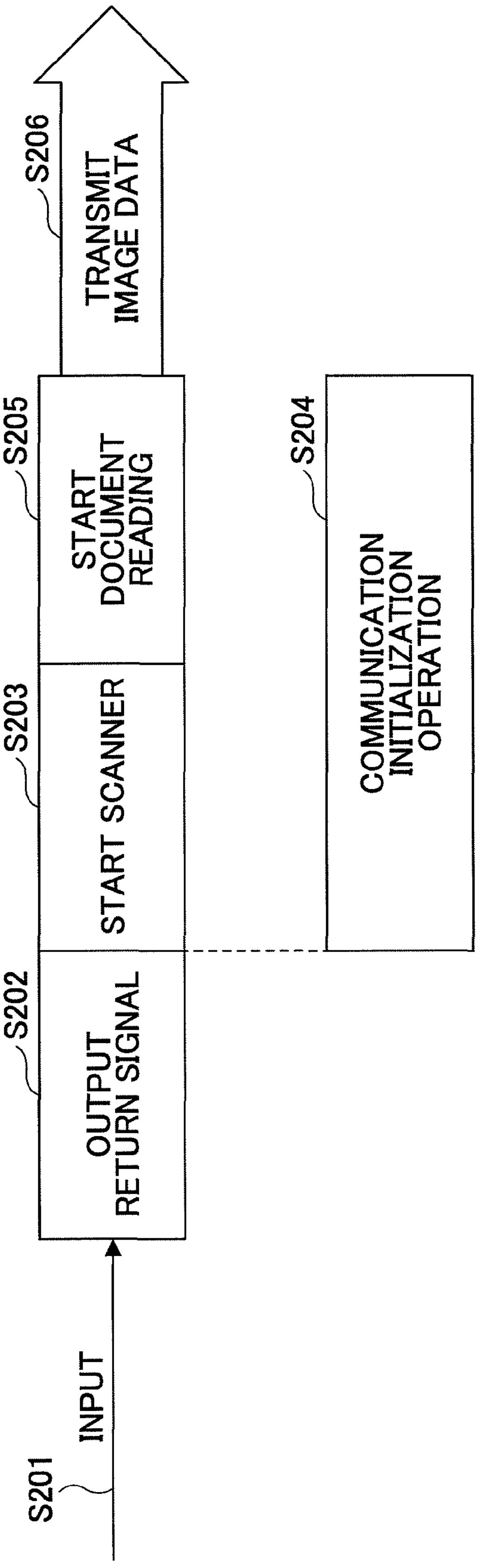
FIG. 6 is a sequence diagram illustrating an operation of a second example.

FIGS. 5 and 6 are a block diagram and a sequence diagram illustrating an operation according to a second example of the embodiment of the present invention. The second example illustrates partial functions different from those of the first example in comparison with the entire structure shown in FIGS. 1 and 2. In FIGS. 5 and 6, when a scanner function is used in the power-saving mode, first, the scanner function is selected (S201: input A) from the operation unit 8 or the personal computer 9 by the user. Then, the return signal B is sent from the controller unit 2 to the scanner unit 6 and the control unit 7 (S202) in accordance with the instruction. The scanner unit 6 becomes capable of reading (S203) and the initialization operation for establishing communication between the controller unit 2 and the control unit 7 is started (S204). During the initialization operation of the controller unit 2 and the control unit 7, it is possible to perform a reading operation of the scanner, so that the scanner starts reading of image data (S205). The image data D is sent from the scanner unit 6 to the controller unit 2 via the control unit 7. When the initialization operation of the controller unit 2 and the control unit 7 is completed, the image data E is transmitted to the personal computer 9, for example (S206). In addition, reference C designates a control signal output from the control unit 7 to an object of control.

In this manner, according to the present example, when the scanner function is used in the image forming apparatus in the power-saving mode, the return signal B is output using the controller unit 2 so as to immediately start and enable the scanner unit 6 reading the document. In accordance with this, while the document is read, it is possible to perform the initialization operation for establishing communication between the controller unit 2 and the control unit 7. Thus, it is possible to reduce the waiting time for the user (start-up time) upon using the scanner function. In this case, only those portions necessary for the scanner function are started, so that it is possible to reduce power consumption.

THIRD EXAMPLE

Figure 7:
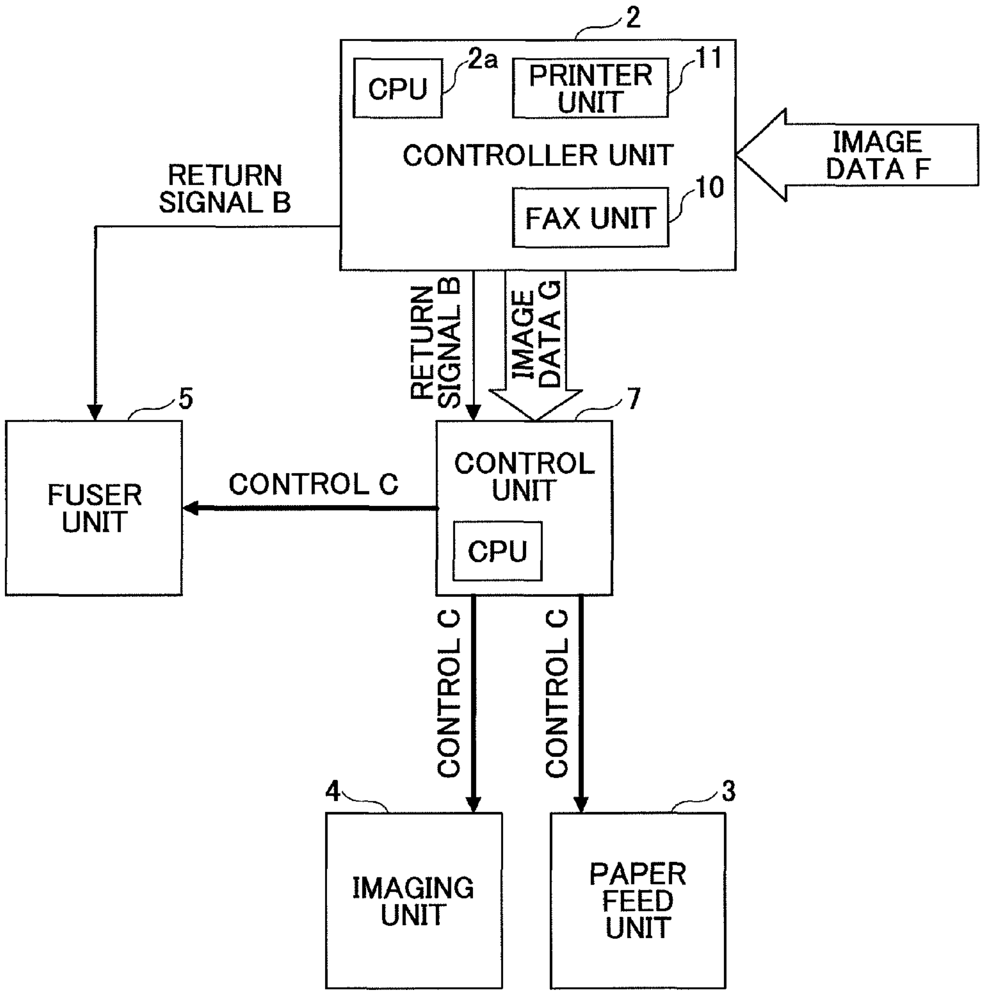
FIG. 7 is a block diagram illustrating an operation of a third example.
Figure 8:
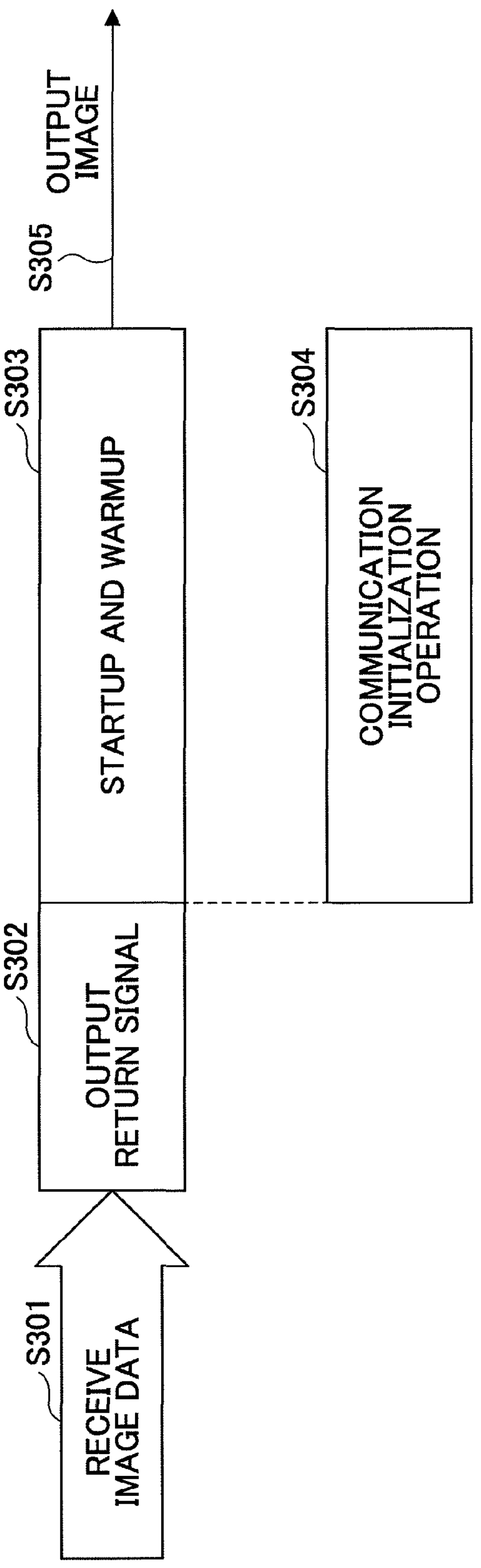
FIG. 8 is a sequence diagram illustrating an operation of a third example.

FIGS. 7 and 8 are a block diagram and a sequence diagram illustrating an operation according to a third example of the embodiment of the present invention. The third example illustrates partial functions different from those of the first and second examples in comparison with the entire structure shown in FIGS. 1 and 2. In FIGS. 7 and 8, when facsimile is received in the power-saving mode, first, FAX reception F is input to the FAX unit 10 (S301). Then, the controller unit 2 outputs the return signal B to the fuser unit 5 and the control unit 7 (S302) upon receiving the FAX reception F, and the imaging unit 4 and the fuser unit 5 start a warm-up operation (S303). Next, while the imaging unit 4 and the fuser unit 5 are performing the warm-up operation, the initialization operation for establishing communication between the controller unit 2 and the control unit 7 is started (S304). When the initialization operation is completed, image data G is transmitted from the controller unit 2 to the control unit 7 and image formation is performed when the imaging unit 4 and the fuser unit 5 become capable of outputting an image (S305). A printer operation is performed in the same manner as in the FAX reception and when a job is input to the printer unit 11 from the user, the controller unit 2 outputs the return signal B to the fuser unit 5 and the control unit 7 upon receiving the job input. In addition, reference C designates a control signal output from the control unit 7 to an object of control.

In this manner, according to the present example, when facsimile is received or a print output instruction is input in the image forming apparatus in the power-saving mode, the return signal B is output using the controller unit 2 so as to immediately perform a start-up operation (warm-up operation) on portions necessary for image forming function. During the operation, the initialization operation for establishing communication between the controller unit 2 and the control unit 7 is performed. Thus, it is possible to reduce the waiting time for the user (start-up time) upon receiving facsimile and performing the print output instruction. In this case, only those portions necessary for the FAX function or the printer function are started, so that it is possible to reduce power consumption.

FOURTH EXAMPLE

Figure 9:
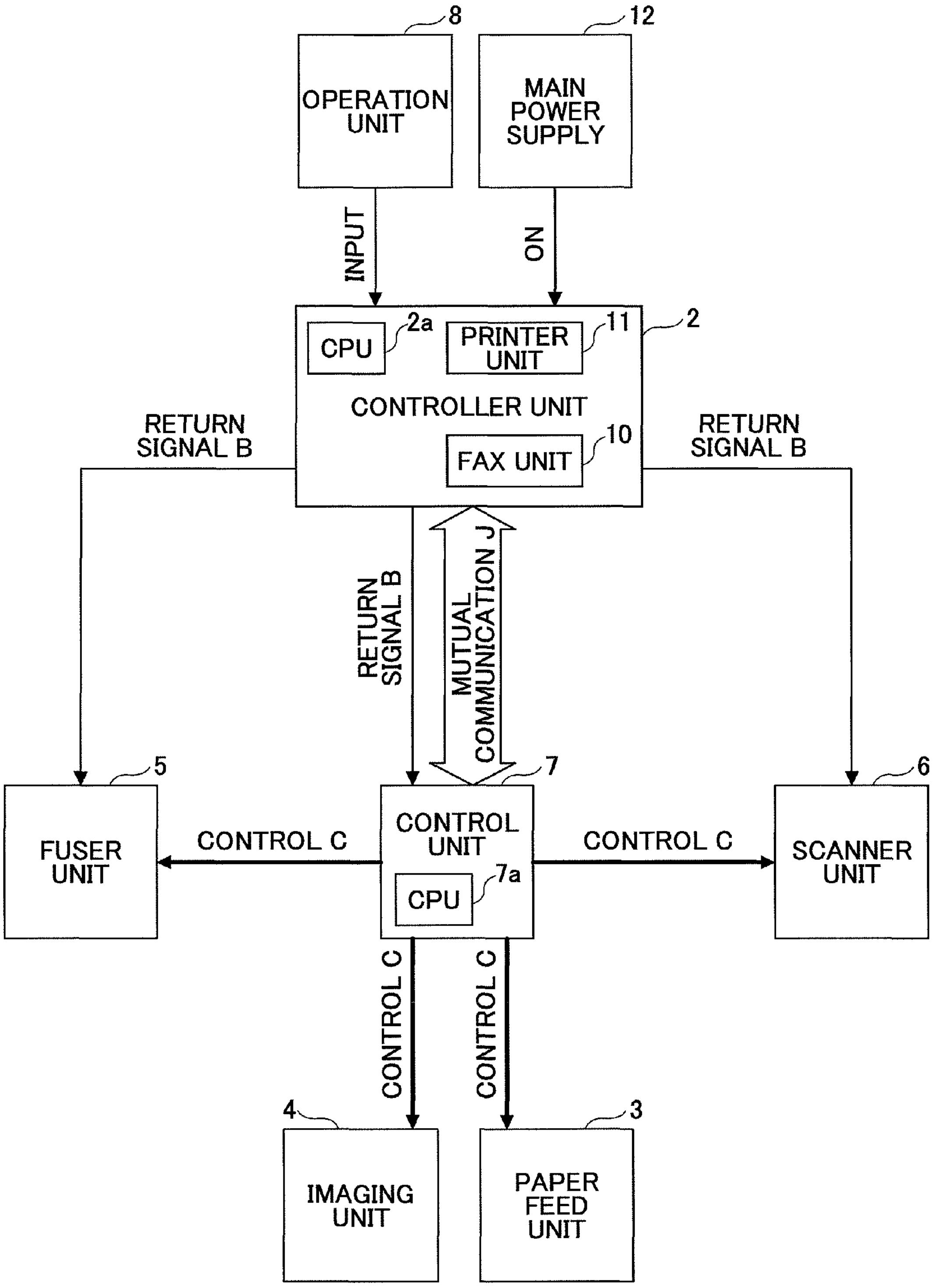
FIG. 9 is a block diagram illustrating an operation of a fourth example.
Figure 10:
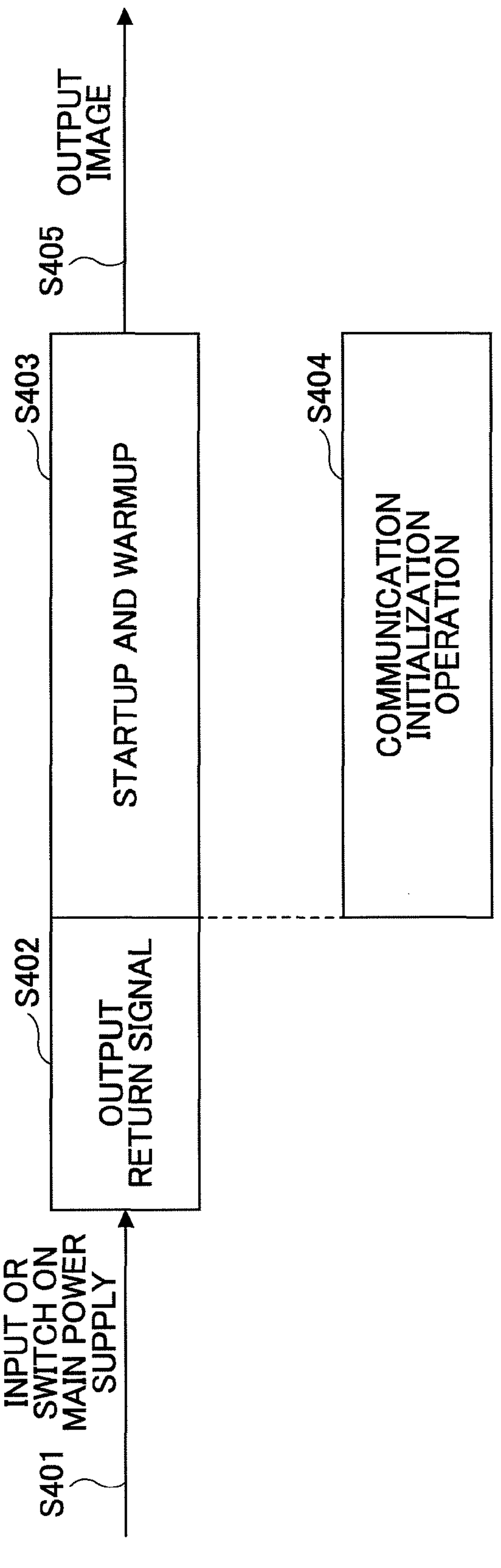
FIG. 10 is a sequence diagram illustrating an operation of a fourth example.

FIGS. 9 and 10 are a block diagram and a sequence diagram illustrating an operation according to a fourth example of the embodiment of the present invention. The fourth example illustrates partial functions different from those of the first to third examples in comparison with the entire structure shown in FIGS. 1 and 2. In FIGS. 9 and 10, when a copying function is used in the image forming apparatus in the power-saving mode or while the main power supply 12 is switched off, the user operates the operation unit 8 or switches on the main power supply 12 and the instruction is sent to the controller unit 2 (S401). Then, first, the controller unit 2 outputs the return signal B to the fuser unit 5, the scanner unit 6, and the control unit 7 (S402) and the imaging unit 4 and the fuser unit 5 start the warm-up operation and the scanner unit 6 becomes capable of reading (S403). Next, while the imaging unit 4 and the fuser unit 5 are performing the warm-up operation, the initialization operation for establishing communication between the controller unit 2 and the control unit 7 is started (S404). When the initialization operation is completed, a number of copies and edit information J are transmitted from the controller unit 2 to the control unit 7 and image formation is performed when the imaging unit 4 and the fuser unit 5 become capable of outputting an image (S405). In addition, reference C designates a control signal output from the control unit 7 to an object of control.

In this manner, according to the present example, when the copying function is used in the image forming apparatus in the power-saving mode or while the main power supply 12 is switched off, the return signal B is output using the controller unit 2 so as to immediately perform the start-up operation (warm-up operation) on portions necessary for the copying function. During the operation, the initialization operation for establishing communication between the controller unit 2 and the control unit 7 is performed. Thus, it is possible to reduce the waiting time for the user (start-up time) upon using the copying function. In this case, only those portions necessary for the copying function are started, so that it is possible to reduce power consumption.

In the first to fourth examples, only one of the functions is started. When two or more functions are started at one time, an operation is performed by combining the same operations as in each example.

The present invention is not limited to the specifically disclosed embodiment, and variations and modifications may be made without departing from the scope of the present invention.

The present application is based on Japanese priority application No. 2007-055646 filed Mar. 6, 2007, the entire contents of which are hereby incorporated herein by reference.

What is claimed is:

1. An image forming apparatus forming a visible image on a recording medium, comprising:

- an input unit configured to input an external instruction to the image forming apparatus;
- a functional element configured to perform an image forming operation;
- a first control unit configured to control the functional element; and
- a second control unit configured to communicate with the first control unit, perform a process in accordance with the instruction input via the input unit, and output a return signal for starting the functional element required for performing the process in accordance with the instruction,
- wherein an initialization operation for establishing communication between the first control unit and the second control unit begins simultaneously with a start-up operation of the functional element required for performing the process.

2. The apparatus of claim 1, wherein the functional element includes a reading unit optically reading a document, and the reading unit transmits image data read from the document to the second control unit via the first control unit.

3. The apparatus of claim 2, wherein the second control unit transmits received image data to a personal computer functioning as the input unit.

4. The apparatus of claim 1, wherein the input unit is an operation unit.

5. The apparatus of claim 1, wherein the functional element includes a scanner.

* * * * *